(No Model.) 2 Sheets—Sheet 1.

J. MAXWELL.
COFFIN LID FASTENER.

No. 369,197. Patented Aug. 30, 1887.

WITNESSES:
A. F. Walz,
C. E. Tomlinson

INVENTOR:
John Maxwell
BY
Duell, Laass &Duell
ATTORNEYS.

(No Model.) 2 Sheets—Sheet 2.
J. MAXWELL.
COFFIN LID FASTENER.
No. 369,197. Patented Aug. 30, 1887.
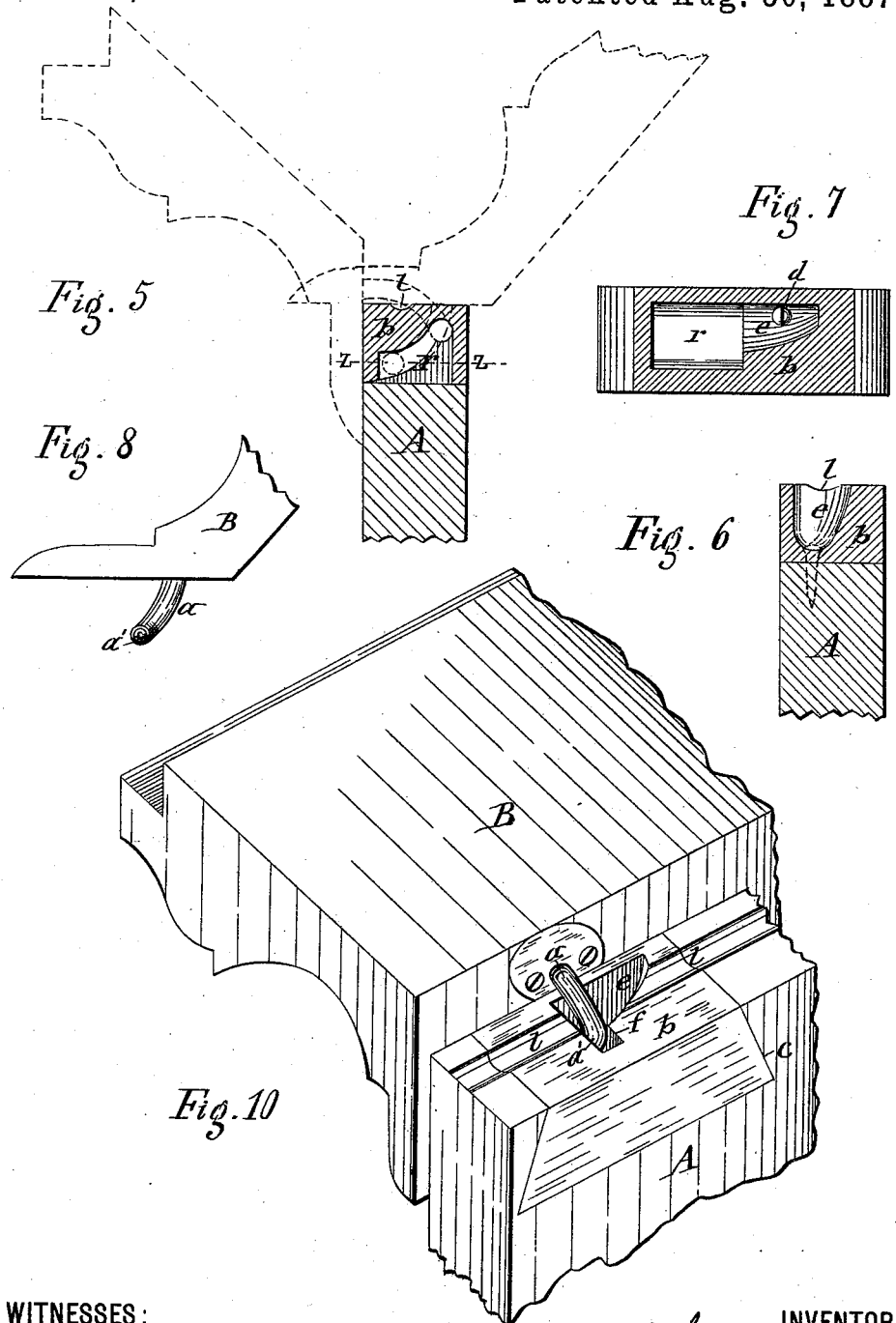
WITNESSES:
A. F. Walz.
C. E. Tomlinson.
INVENTOR:
John Maxwell
BY
Duell, Laass & Duell
ATTORNEYS.

United States Patent Office.

JOHN MAXWELL, OF ONEIDA, NEW YORK.

COFFIN-LID FASTENER.

SPECIFICATION forming part of Letters Patent No. 369,197, dated August 30, 1887.

Application filed March 4, 1887. Serial No. 229,669. (No model.)

*To all whom it may concern:*

Be it known that I, JOHN MAXWELL, of Oneida, in the county of Madison, in the State of New York, have invented new and useful Improvements in Lid-Fasteners for Burial-Caskets, of which the following, taken in connection with the accompanying drawings, is a full, clear, and exact description.

This invention relates to the class of lid-fasteners in which a hook on the under side of the lid engages a plate secured to the top of the casket, and is adapted to turn in said plate without losing its hold thereon, and thus operate in the manner of a hinge which is capable of sustaining the lid in its open position.

My invention consists in an improved construction and combination of parts which constitute a lid-fastener of superior strength, to allow the casket to be safely lifted by its lid and to support the lid in its open position without danger of breaking the fastener.

Figure 1:
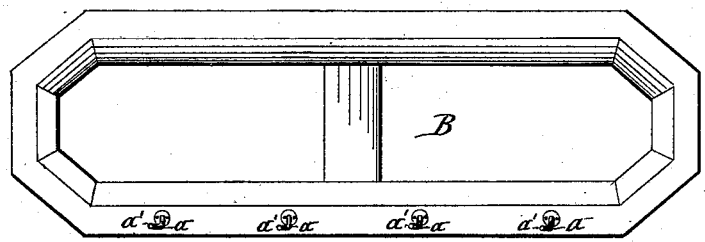
Figure 2:
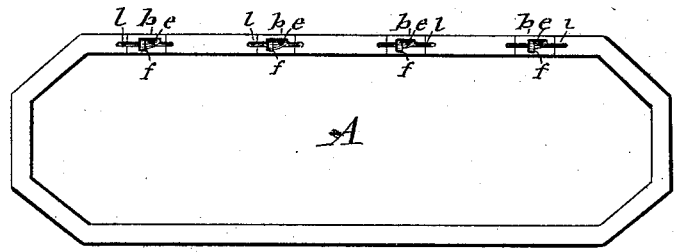
Figure 3:
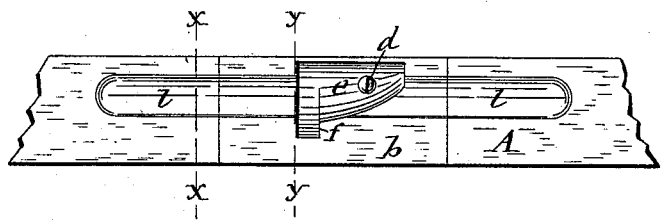
Figure 4:
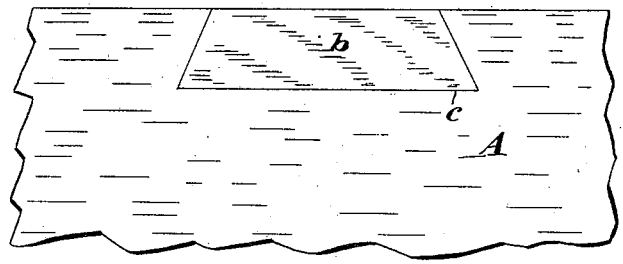
Figure 9:
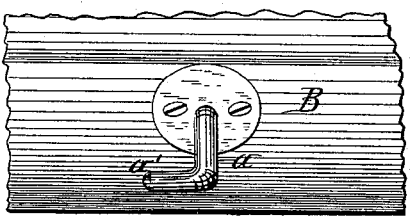

The invention is fully illustrated in the annexed drawings, in which Figure 1 is an inverted plan view of the casket-lid. Fig. 2 is a top plan view of the casket. Fig. 3 is an enlarged top plan view of one of the plates attached to the casket. Fig. 4 is a side view of the same. Figs. 5 and 6 are vertical transverse sections, respectively, on lines $x\,x$ and $y\,y$, Fig. 3. Fig. 7 is a horizontal longitudinal section on line $z\,z$, Fig. 5. Fig. 8 is a detached transverse sectional view of that portion of the lid to which the hook-shaped lug is attached. Fig. 9 is a view of the under side of the aforesaid portion of the lid, and Fig. 10 is an isometric view showing my lid-fastener in position for supporting the lid in its open position.

Similar letters of reference indicate corresponding parts.

A represents the casket, and B the lid thereof. To the under side of the lid, at one side thereof, I rigidly secure hook-shaped lugs $a\,a$, which project downward and have their shanks inclined outward, as best seen in Fig. 8 of the drawings, and have their hook portions $a'$ standing in the direction of the length of the lid, as shown in Fig. 9 of the drawings. Said lugs are properly distributed on the lid to obtain the necessary hold on the casket, which latter has the metallic catch-plates $b\,b$ secured in corresponding positions to the upper part of the side wall.

In order to firmly secure the plate $b$ to the casket without the necessity of employing large attaching-screws, which are liable to split the wood, I form the said plate dovetail transverse and cut into the top of the side wall of the casket a corresponding dovetailed mortise, $c$, and introduce the plate in said mortise from the side of the casket. A small nail or screw, $d$, passing vertically through the plate and into the wall of the casket, serves to prevent the plate from slipping out of the mortise. The plate $b$, I provide with a socket, $e$, which is near the outer edge of the plate, and is elongated in the direction of the length of the casket and adapted to receive bodily the lugs $a\,a'$ of the lid. Said plate is also formed with a recess, $r$, underneath the top thereof, which recess extends from one end of the socket in the direction of the length of the casket and from the bottom of the socket at the side adjacent to the outside of the casket to the opposite side of the upper part of the socket and part way into the socket, so as to form in the latter an offset or shoulder, $f$, for the purpose hereinafter explained.

The recess $r$ is of proper dimensions to adapt it to receive endwise the hook portion $a'$ of the lug of the lid.

The operation of my improved lid-fastener is as follows: In applying the lid to the casket I place the lid with its lugs $a\,a'$ resting on top of the side of the casket containing the plates $b\,b$, and with the opposite side of the lid raised to an angle of about forty-five degrees, this position being necessary to allow the outwardly-inclined lugs $a\,a'$ to enter into the sockets $e\,e$ of the plates $b\,b$. After the lugs are thus entered the lid, while retained in its inclined position, is to be slipped endwise on the casket, so as to cause the hook portions $a'$ of the lugs to enter into the recesses $r$ of the plates $b\,b$. The lid thus becomes hinged on the casket. The outward inclination of the lugs allows the lid to be turned from its aforesaid inclined and open position to a horizontal and closed position on the casket, and also allows the lid to be swung open and past a vertical position, and to be sustained in said position by the engagement of the hook portions $a'$ of the lugs with the top of the interior of the recesses $r\ r$ at the side adjacent to the inside of the casket. When the lid is open, the shoulder $f$ engages the heel of the hook $a'$, and when the lid is closed said shoulder engages the back of the upper portion of the lug $a$, and thus the hook $a'$ is prevented from being withdrawn from the recess $r$.

It will be observed that my improved lid-fastener differs very materially from analogous fasteners, not only in regard to construction and operation, but also in effect.

Prior devices of this class have the engagement of the hook transverse on the catch-plate and near the outward edge of said plate, or in proximity to the lid when supported in its open position by the engagement of the aforesaid parts. It is evident to any one of ordinary mechanical skill that the transverse strain on the catch-plate at the side adjacent to the lid hung thereon is very great and liable to break the catch-plate, especially when employed on lids of the weight of those applied to burial-caskets. In my invention this defect is entirely obviated by the engagement of the hook lengthwise the catch-plate and at the side farthest from the lid hung on said plate, as illustrated by full lines in Fig. 10 of the drawings and in dotted lines in Fig. 5 of the drawings.

In order to facilitate the application of the lid to the casket, I provide the top of the plates $b\ b$ and side wall of the casket with longitudinal grooves $l\ l$, extending from the sockets $e\ e$. By placing the hook portion $a'$ of the lugs in the aforesaid grooves and sliding the lid lengthwise in the proper direction the lugs are guided into the sockets of the plates.

I do not claim, broadly, a lid-fastening comprising a plate attached to the top of the casket and a hook attached to the lid and adapted to engage the aforesaid plate in such a manner as to form a hinge which allows the lid to be opened from one side of the casket, and is adapted to support said lid in its open position, as I am aware the same is not new; but What I do claim as my invention is—

1. In combination with the casket and its lid, a hook-shaped lug projecting from the under side of the lid and having its shank inclined outward, and its hook portion standing in the direction of the length of the lid, and a plate secured to the upper part of the side wall of the casket and provided with a socket open toward the top of the plate, and adapted to receive bodily the aforesaid lug, a recess underneath the top of the plate, extending from the socket in the direction of the length of the casket, and from the bottom of the socket at the side adjacent to the outside of the casket to the opposite side of the upper part of the socket and part way into the latter, substantially as described and shown.

2. In combination with the casket and its lid, a hook projecting from the under side of the lid, a dovetailed mortise formed transverse through the top portion of the side of the casket, and a corresponding dovetailed plate inserted in said mortise and formed with a socket, and with a recess extending from said socket, substantially as described and shown.

In testimony whereof I have hereunto signed my name and affixed my seal, in the presence of two attesting witnesses, at Oneida, in the county of Madison, in the State of New York, this 24th day of February, 1887.

JOHN MAXWELL. [L. S.]

Witnesses:
 FRED A. MURTY,
 F. G. MILLER.